United States Patent [19]
Brandt

[11] 3,902,746
[45] Sept. 2, 1975

[54] CURL SEAL

[75] Inventor: Timothy B. Brandt, Des Moines, Iowa

[73] Assignee: Parr Manufacturing Inc., Des Moines, Iowa

[22] Filed: Dec. 26, 1973

[21] Appl. No.: 427,456

[52] U.S. Cl. ............... 285/331; 29/508; 29/511; 29/516; 210/448; 285/382.2
[51] Int. Cl. .............................................. F16l 25/00
[58] Field of Search ........ 285/331, 382, 382.2, 202, 285/203, 204; 29/508, 511, 516, 163.5 F; 210/446, 448

[56] References Cited
UNITED STATES PATENTS

| | | |
|---|---|---|
| 1,170,927 | 2/1916 | Moore ................................ 29/511 |
| 1,481,217 | 1/1924 | Maloy ............................. 285/203 X |
| 1,690,562 | 11/1928 | Trout ................................. 285/382 |
| 2,283,989 | 5/1942 | Henry ............................. 210/446 X |
| 3,382,984 | 5/1968 | Kuss.................................. 210/448 |
| 3,410,939 | 11/1968 | Driza et al. .......................... 29/508 |

Primary Examiner—Richard J. Scanlan, Jr.
Assistant Examiner—Moshe I. Cohen
Attorney, Agent, or Firm—Henderson & Strom

[57] ABSTRACT

A filter having a casing with a filtering element and a magnet disposed in the casing. The casing is connected to a bushing by a novel sealing joint. The sealing joint is formed by a novel method of making a sealing joint by curling over or reversing a leading edge of the casing and crimping a portion of the bushing over the curled or reversed portion of the casing.

9 Claims, 6 Drawing Figures

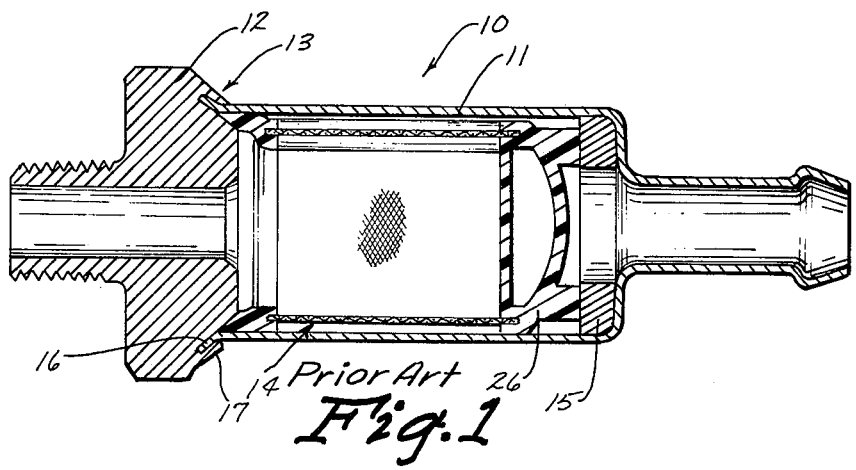
Fig. 1 *Prior Art*
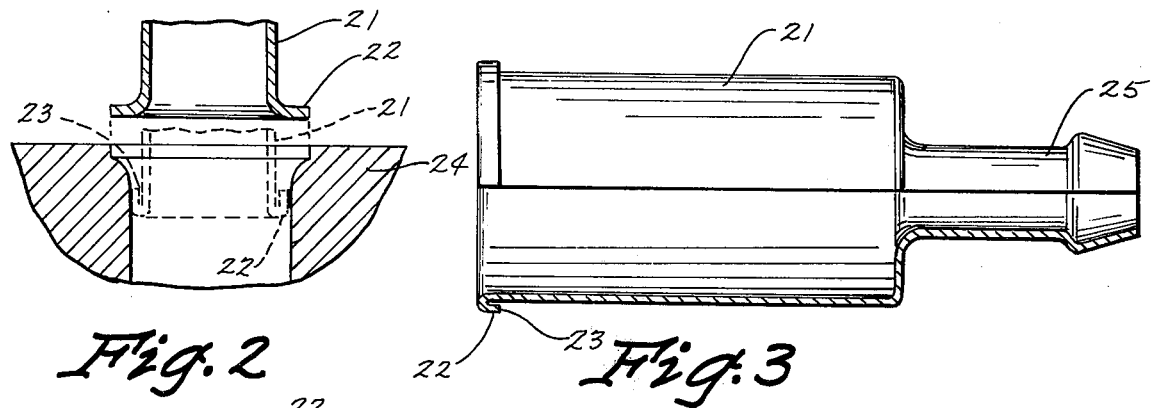
Fig. 2  Fig. 3
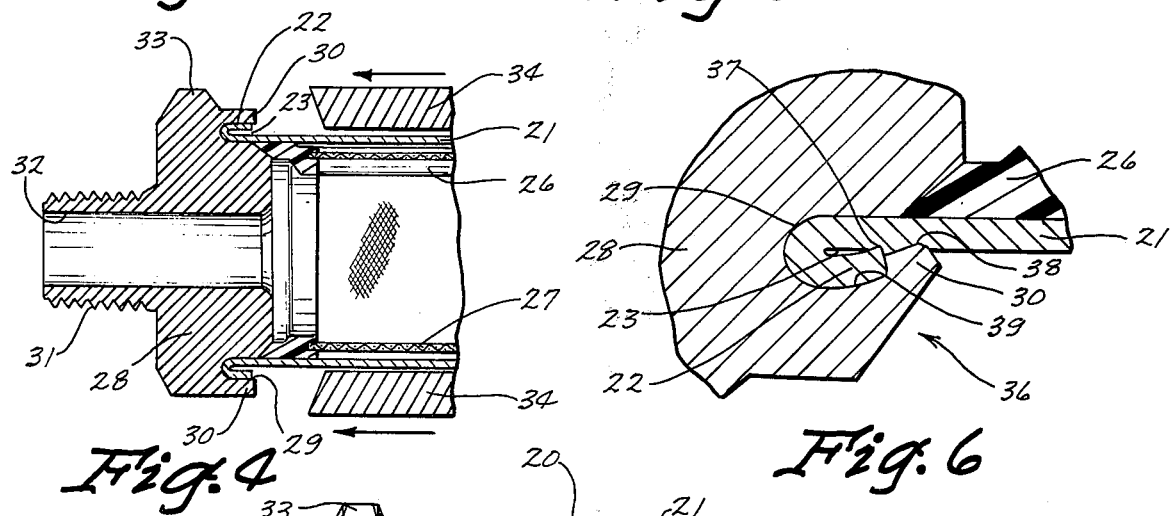
Fig. 4  Fig. 6  Fig. 5

CURL SEAL

BACKGROUND OF THE INVENTION

The present invention relates generally to sealing joints, and more particularly to a metal-to-metal sealing joint.

The problem of joining two members to provide a fluid impervious joint is an old one. This problem has been solved in innumerable ways, each solution to this problem normally being solved by taking into consideration the particular requirements needed for the particular sealing joint.

The most important characteristic of any sealing joint is, of course, that it provide a sure and dependable seal. In the manufacture of automobile gasoline filters, for example, certain standards must be met to accomplish this reliability.

Certain leak causing hazards exist in an automobile gasoline line filter due to such things as the vibrations that it must withstand and the possibility that unskilled persons might install or replace it. Because it is critical that gasoline not leak out of a gasoline line, those within the automobile industry have set certain standards for the sealing joints of such a filter. These standards must be met within critical size limitations specified by those within the automobile industry. Besides the limitation that the joint provide a dependable seal, is the requirement that the seal be able to withstand a predetermined amount of torque without twisting, which may cause failure of the seal.

The problem of producing a sealing joint for gasoline line filters which conforms to the rigorous standards of those within the automobile industry has not been solved completely, without resort to a significantly more costly structure, such as the addition of a sealing glue in each of the joints.

SUMMARY OF THE INVENTION

The present invention relates to a novel sealing joint and the method of making the joint. The method includes curling or reversing a leading edge of a casing wall, placing the leading edge of the casing wall in a groove, and crushing a side wall of the groove over the curled leading edge. The resultant sealing joint is constantly maintained in a tight, sealing relationship with the bushing since the curled over leading edge exerts a continual force against the crushed side wall of the groove.

An object of the present invention is to provide a simple and dependable sealing joint.

Another object is to provide a sealing joint which will withstand a high degree of torque without moving or breaking the seal.

A further object of this invention is to provide a metal-to-metal seal which requires no additional sealing compound.

Still another object of the present invention is to provide a structure in which the parts of a sealing joint exert continual pressure on other parts of the sealing joint structure.

Other objects, advantages, and novel features of the present invention will become apparent from the following detailed description of the invention when considered in conjunction with the accompanying drawings.

BRIEF DESCRIPTION OF THE DRAWINGS

FIG. 1 shows a typical prior art automobile fuel filter in cross section;

FIG. 2 shows a cross sectional view of the apparatus and method for forming a curl for the seal of the instant invention;

FIG. 3 shows a partial cross sectional view of the fuel filter casing of the instant invention;

FIG. 4 shows a cross sectional view of the structure of this invention during one step of the forming process;

FIG. 5 shows a partial longitudinal cross sectional view of an automobile gasoline line filter as produced in the instant invention;

FIG. 6 is an expanded cross sectional view of the curl joint of the instant invention as shown in FIG. 5.

DESCRIPTION OF THE PREFERRED EMBODIMENT

FIG. 1 shows a typical prior art gasoline fuel line filter 10. A casing 11 is connected to a bushing 12 by a sealing joint 13. Inside of the fuel filter is a nylon screen 14 for filtering out foreign particles in the gasoline and magnet 15 for preventing particles of metal from passing through the filter.

It is to the joint 13 that the improvement of the present invention is directed. Casing 11 has a flared portion 16 on one end thereof, which is received in an annular groove in bushing 12. Also normally received in this bushing groove is a sealant (not shown). Shoulder 17 is then clamped over flare 16 to hold and seal the flared portion 16. Because of the particular relationship of bushing 12, flare 16 and shoulder 17, and the method normally used for making this joint, there will always be a minute space between the flare 16 and the shoulder 17, which explains the need for a sealant in joint 13. One of the reasons why the minute space is necessarily present is due to the fact that the metal in shoulder 17 tends to relax slightly regardless of how much force is applied to it and thereby flare 16.

Now, referring to the present invention, FIG. 2 shows a portion of casing 21 for an automobile gasoline line filter 20 (FIG. 5) which can be formed in much the same manner as that of casing 11 in FIG. 1. Casing 21 is normally made of a sheet metal, for example of steel of a type which can be formed with a press, and bent into any reasonable shape desired. Shoulder 22 is shown in a flattened state in FIG. 2, and is curled over or reversed as shown in dashed lines in FIG. 2. A small space 23 is then formed between the lip 22 and the main wall portion of casing 21. This forming is done by the forcing the casing 21 downwardly as shown in FIG. 2 through the forming tool 24. An equivalent method of curling or reversing the leading edge of the casing 21 is to force the flat edge or lip 22 directly into groove 29. Under this equivalent method step, lip 22 will curl over because groove 29 is sized so that there is simply not room in groove 29 to receive lip 22 in a uncurled state.

The resultant casing configuration is shown in FIG. 3, however, the only critical portion shown is at lip 22 with an elongated slot or space 23 between the lip 22 and the main casing wall 21. A hose connection 25 is connected to the casing 21, and may be of any desired configuration.

FIG. 4 shows the casing 21 with a support structure 26 therein for supporting a nylon screen 27. Casing 21 is oriented with respect to bushing 28, whereby the leading end of the casing 21, including lip 22 and space 23, is disposed in groove 29 of the bushing 28. Annular shoulder member 30 forms an outer annular wall for the groove 29. Shoulder member 30 is connected on one end to the main body portion of bushing 28 and terminates on its other end with a free end. The bushing 28 also includes a threaded connector 31 and a bore 32 which leads to the inside of casing 21. A hexagonal shaped portion 33 on the bushing 28 is provided for receiving a wrench or other tool for installing the gasoline filter 20 in a gasoline line. By way of example only, the bushing 28 may be made of a mild, low carbon steel.

An annular form tool 34 is also shown in FIG. 4, and is moved in the direction of the arrows so as to abut the free end of annular shoulder member 30 with a force which is beyond the yield strength of the metal of which bushing 28 is made. The result of this forming operation is the joint 36 of FIGS. 5 and 6. It can also be seen that the support structure 26 for nylon filter screen 27 and the magnet 35 are thereby rigidly supported inside casing 21 by the curl joint 36.

FIG. 6 shows in more detail the sealing curl joint formed by this process. The free end of annular shoulder member 30 has been plastically deformed because of the action of form tool 34. In being so deformed beyond the yield strength of the metal in annular shoulder member 30, the groove 29 has been substantially closed by the metal of shoulder 30 that was forced to flow into groove 29. The remainder of the groove being filled with the casing 21, including the annular lip 22. During this deformation process, the lip 22 has been pushed beyond where it is actually shown in FIG. 6, in the direction of space 23. Also surface 39 of shoulder member 30 has been pushed, in the same direction, beyond where it is ultimately shown in FIG. 6. This moving back of the metal phenomenon is due primarily to a slight stress relaxation of the plastically deformed portion of annular shoulder member 30. Also because of this relaxation effect in lip 22, and because part of lip 22 has only been elastically deformed, lip 22 will tend to exert a continual pressure on surface 39, even if surface 39 has moved back slightly by reason of stress relaxation. This prevents any loosening up of the seal formed between surface 39 and annular lip 22. It will also be clear to those skilled in this art that the fact that surface 39 was pushed beyond where it will ultimately lie, as shown in FIG. 6, will make a tighter and stronger joint than in an instance where a surface is merely pushed against one or more other surfaces which have no available space behind them to allow overflexing, for example in the instance of joint 13 of FIG. 1.

It can be seen in FIG. 6 that the plastic deformation of annular shoulder member 30 fills every available space in the groove 29. In addition, it causes a bite 38 in case 21, such that a portion of the annular shoulder 30 extends into a depression in casing 21. In addition, a similar bite 37 is formed by lip 22 in the wall of casing 21 by the great amount of force which caused the deformation of annular shoulder member 30. The relative size of opening 23 may vary somewhat, and in some instances may appear to be practically non-existent.

It should also be noted that a large surface contact area is formed inside the curl seal 36 between casing 21 and bushing 28, which tends to produce a more reliable seal than if a small contact area is used between casing 21 and bushing 28. It will be understood that this large contact area causes a high resistance to the turning of bushing 28 with respect to casing 21, to thereby easily comply with the torque requirements of the automobile industry, for example. This resistance to torque is enhanced by the bites 37 and 38, and the fact that lip 22 exerts a continual pressure on surface 39 of annular shoulder member 30, as explained above.

Obviously many modifications and variations of the present invention are possible in light of the above teachings. It is therefore to be understood that, within the scope of the appended claims, the invention may be practiced otherwise than as specifically described.

I claim:

1. A sealing joint comprising:
   a casing having a substantially cylindrical wall thereon, said wall having a main wall portion and one end of said wall having a reverse bend thereon, including a lip, a depression being formed in said main wall portion of the casing;
   a bushing including a main body member and a shoulder member connected to said main body member at one end thereof, said shoulder member having a free end at the other end thereof;
   a groove disposed between said shoulder member and said main body member;
   said one end of the casing wall being disposed in said groove;
   said free end of the bushing shoulder member abutting said main wall portion of the casing, a portion of said free end of the shoulder member being disposed in said depression in the main wall portion of the casing.

2. A sealing joint as defined in claim 1 wherein said free end of said shoulder member also abuts said lip.

3. A sealing joint as defined in claim 2 wherein said casing wall has a second depression formed therein and a portion of said lip is disposed in said second depression.

4. A sealing joint as defined in claim 1 wherein said wall of the casing and said shoulder member of the bushing have an annular configuration.

5. A sealing joint as defined in claim 1 wherein said lip is disposed between the wall of the casing and the shoulder member of the bushing.

6. A sealing joint as defined in claim 1 wherein said one end of the casing wall abuts said main body portion of the bushing.

7. A sealing joint as defined in claim 1 including means for maintaining at least a portion of said free end under compression.

8. A sealing joint as defined in claim 1 wherein said groove is completely filled by said casing.

9. A sealing joint as defined in claim 1 wherein said casing is of a metal material.

* * * * *